United States Patent [19]

Lyon

[11] Patent Number: 5,225,175

[45] Date of Patent: Jul. 6, 1993

[54] SELF-SCRUBBING REMOVAL OF SUBMICRON PARTICLES FROM GASEOUS EFFLUENTS

[75] Inventor: Richard K. Lyon, Pittstown, N.J.

[73] Assignee: Energy and Environmental Research Corporation, Whitehouse, N.J.

[21] Appl. No.: 901,820

[22] Filed: Jun. 22, 1992

[51] Int. Cl.⁵ ............ C01B 21/00; C01B 17/00; C01B 17/20; C01B 17/45

[52] U.S. Cl. ............ 423/235; 423/243.06; 423/512 A; 423/545

[58] Field of Search ............ 423/243.06, 545, 235, 423/235 D, 512 A

[56] References Cited

U.S. PATENT DOCUMENTS

| | | | |
|---|---|---|---|
| 1,496,410 | 6/1924 | Doremus et al. | 423/545 |
| 3,970,740 | 7/1976 | Reeder et al. | 423/242 |
| 4,649,033 | 3/1987 | Ladeira et al. | 423/545 |
| 4,849,192 | 7/1989 | Lyon | 423/235 |
| 4,921,886 | 5/1990 | Ewan et al. | 423/235 |

OTHER PUBLICATIONS

Chappel, G. A., "*Aqueous Scrubbing of Nitrogenous Oxides from Stack Gases*" American Chemical Society, Washington, D.C. (1973) pp. 206-217.

Shale, G. C., "*Ammonia Injection: A Route to Clean Stacks*" American Chemical Society, Washington, D.C. (1973) pp. 195-205.

*Primary Examiner*—Gregory A. Heller

[57] ABSTRACT

The invention comprises a method and a system for separating very fine particulates from gaseous effluents resulting from the burning of coal or other fossil fuels, or from other combustion processes, such particulates being too small for typical methods to separate. The method utilizes the $SO_2$, which normally occurs in such gaseous effluents, as a vehicle to enlarge the particles. The gaseous effluent is mixed with water droplets whereby some of the water evaporates; a gaseous ammonia is then injected into the mixture under conditions such as to cause ammonium sulfite to form and to condense on the particles, thus enlarging the particles, and water to condense on the particles, thus further enlarging them; and the now enlarged particles are separated from the gaseous effluent by known methods. $DeNO_x$ and $DeSO_x$ procedures may also be performed on the gaseous effluent prior to the process noted above. Likewise heat recovery may be effected.

40 Claims, 3 Drawing Sheets

SELF-SCRUBBING REMOVAL OF SUBMICRON PARTICLES FROM GASEOUS EFFLUENTS

BACKGROUND

1. Field of the Invention

The invention is in the field of methods and apparatus for removing submicron particles from gaseous effluents containing sulfur dioxide and other substances in addition to submicron particles. More specifically, the present invention has particular application for the removal of such particles from flue gas produced by burning coal.

2. Related Technology

Throughout the years, a great deal of technology has been developed for removing pollutants from gaseous effluents produced by combusting fossil fuels, and manufacturing processes such as these involving manufacture of gasoline and other hydrocarbonaceous products. These pollutants have comprised a large variety of substances, among which are typically included such substances as $NO$, $NO_2$, $SO_2$, $SO_3$, and fine particulates. These substances can be very damaging to human health if present in sufficient quantities. Unfortunately, such damaging quantities can and do exist unless adequate precautions are taken. Due to increased energy demands the number of polluting sources has increased greatly during the last few decades, and thus there is a steadily increasing need for increased precautions. This has led to the issuance of State and Federal standards and regulations, such as the Clean Air Act of 1977, the National Energy Act, the National Primary and Secondary Ambient Air Quality Standards, etc. High on the list of substances to be controlled are the fine particulates, and the $NO_x$ ($NO$ and $NO_2$), and the $SO_x$ ($SO_2$ and $SO_3$) substances. $SO_3$ is particularly dangerous since it reacts with water to form sulfuric acid, which falls as acid rain if vented to the atmosphere. Additionally, $SO_3$ causes rapid deterioration of equipment downstream from the combustor.

Fine particulates are dangerous to human health in that they deposit in the respiratory system and the lungs. Many of these particles may comprise toxic substances, such as lead, arsenic, antimony, bismuth, mercury, and cadmium. Fortunately, the respiratory system in most individuals can remove most particles larger than about 3 $\mu m$. However, the smaller particles are capable of penetrating deep into the lungs wherein they increase airway resistance and susceptibility to infection, and reduce lung function. Unfortunately, the air quality standards, which are based merely on the mass concentration of total suspended particulate material (TSP), do not relate very well to damage to human health. Although the total mass of particulates larger than about 1 $\mu m$ far exceeds the mass of the smaller particles the number of submicron particles far exceeds the number of the larger particles. Additionally, the surface area of the smaller particles greatly exceeds the surface area of the larger particles, and thus the condensation of toxic elements occurs chiefly on the smaller particles. There are presently no regulations for controlling specifically the discharge of submicron particles into the atmosphere because of the lack of any significant method or system for controlling such. Consequently, such a method and system are greatly needed.

As noted above, other polluting substances which must be removed are $SO_2$ and $SO_3$. Typically the $SO_2$ comprises about 98% to 99% of the total $SO_x$, and the $SO_3$ about 1% to 2% of the total $SO_x$. However, the $SO_3$ is very damaging, as noted above. If not removed or reduced during or following combustion then the temperature of the flue gas must be vented at a temperature higher than the acid dew point, about 132.2° C. for a typical coal, in order to prevent equipment damage due to the formation of sulfuric acid.

Among current methods for such removal are coal cleaning processes, practiced prior to combustion of the coal. However, these methods represent a not inconsiderable expense.

Another method involves the use of flue gas desulfurizing (FGD) equipment, such as wet scrubbers, after combustion. However, this results in a significant loss of the heat of combustion of the coal. As an example, wet scrubbers typically reduce the temperature of the flue gas to the bulk water dew point, about 52.5° C. for a typical flue gas. It will be assumed that in the absence of FGD equipment heat is first recovered from the flue gas so as to reduce the temperature to a value somewhat above the acid dew point, approximately 132.2° C. for a typical flue gas. However, if FGD equipment is used, the temperature is reduced to about the bulk water dew point, being about 52.2° C. for a typical flue gas. Reducing the temperature from the acid dew point to the bulk water dew point represents about 4.4% of the heat of combustion, which is lost. After scrubbing, the flue gas must be reheated above the acid dew point since the scrubbing process removes the $SO_2$ but only partially removes the $SO_3$. This represents another 4.4% of the heat of combustion. Thus, the total heat lost is 4.4+4.4=8.8% of the heat of combustion.

Another popular method involves the use of fluidized-bed combustors (FBCs). FBCs have the capability to remove much of the $SO_x$ by using absorbent materials in the bed, thus eliminating the need for coal cleaning or flue gas desulfurizing. However, the particulate emissions from FBCs are greater than those from pulverized-coal combustors (PCCs) due to the elutriation of bed material and the necessity of recycling unburned carbon used in the FBC process. Thus, when FBCs are used more efficient particle separators must be used. Electrostatic precipitators, such as are commonly used in conjunction with PCCs, do not work well with the particulates from FBCs since the dust resistivity from FBCs is much higher, being $> 10^{11}$ $\Omega cm$ rather than the usual $< 5 \times 10^9$ $\Omega cm$ from PCCs. Furthermore, particles less than 0.1 to 0.2 microns do not move in response to gravitation or electrostatic forces. The standard method, at least in the United States, is to use fabric filters. In order to reduce wear and tear on these filters the flue gases exiting the usual recycle cyclones are first cooled, so as to reduce temperature and velocity, before being introduced to the filters. All of this represents increased cost. Thus, once again, a simple method and system for removing submicron particles is very much needed.

Other pollutants which must be removed are the $NO_x$ gases. Various methods are used today. One such is the selective noncatalytic NO reduction process, commonly termed the Thermal DeNO$_x$ process. This process is described in U.S. Pat. No. 3,900,554 to Lyon, issued Aug. 19, 1975, and thus is not described further herein. In this process nitric oxide (NO), the predominant $NO_x$ component in flue gas (about 90%) is reduced, at least partially, by contact with ammonia and oxygen at approximately 1000° C., eventually resulting in nitrogen and water. When performed properly, and controlled closely, very little ammonia is left over. Another process is the selective catalytic NO reduction process, commonly termed the catalytic DeNO$_x$ process, which involves the processing of the gaseous effluent and ammonia over a catalyst, such as copper, at about 400° C. The copper is converted to an oxide, and then to a sulfate, and then the NO$_x$ reduction begins. This process is well known in the industry and thus is not described further herein.

Still another method is to limit the excess air which is supplied to the combustor. However, all of these methods have their drawbacks.

Another aspect worthy of note relates to the recovery of sensible heat from the flue gas. Normally, since SO$_3$ is present, heat can only be recovered to the point where the temperature of the flue gas is higher than the acid dew point, 132.2° C., so as to avoid the formation of sulfuric acid, as noted above. However, if the SO$_3$ could be removed or reduced, then sensible heat could be recovered to the point where the temperature approached the buoyancy temperature necessary for venting, about 82.2° C., as noted above.

There is a process whereby SO$_3$ can be reduced to SO$_2$ which involves the injection of methanol into the flue gas. However, this process does not remove the SO$_2$. It would be of great advantage if the SO$_2$ could be removed along with removal of the submicron particulates.

OBJECTS AND BRIEF DESCRIPTION OF THE INVENTION

A principal object of the instant invention is to provide an economical method and a system whereby submicron particles can be removed from gaseous effluents resulting from combustion processes, particularly the combustion of coal.

Another object of the invention is to provide an economical method and system whereby residual SO$_3$ can be reduced to SO$_2$ and the resultant SO$_2$ removed from the effluent along with other residual SO$_2$, along with the submicron particles.

Still another object of the invention is to provide a method and system whereby residual NO can be oxidized to NO$_2$ and the resultant NO$_2$ removed along with other residual NO$_2$, along with the submicron particles.

Still another object of the invention is to provide a method and system whereby less of the heat of combustion of coal is lost during purification of the flue gases than is typical of contemporary processes.

A basic aspect of the instant invention is the development of a method and system whereby the submicron particles are caused to grow to a larger size, such that they can be effectively collected by known methods. Additionally, the growth process involves the use of residual SO$_2$, such that the SO$_2$ is removed along with the enlarged particles. And still further, the growth process is such that residual NO$_2$ is captured and removed along with the enlarged particles. And still further, the growth process is such that the amount of heat required to effect the purification process is significantly less than that required by contemporary processes. Thus, all of the objectives are realized by the instant invention.

The process for particle growth is described below in connection with its use with flue gas produced by the combustion of coal. However, the process would be similar for gaseous effluents produced by the combustion of oil or natural gas, or by the use of combustion in the production of gasoline or other hydrocarbonaceous products, wherein the gaseous effluent contains submicron particles and SO$_2$.

A unique advantage of the instant invention is that the residual SO$_2$ is utilized as a means for removing the submicron particles, and is not just a pollutant which must be removed. Basically, the process functions as follows:

Sensible heat is preferably first recovered from the flue gas by means of a heat exchanger, reducing the temperature of the flue gas to a predetermined value, which must be higher than the bulk water dew point of the flue gas. A fine mist of cold water droplets is then injected into the flue gas, of such quantity that the temperature of the flue gas is reduced to approximately the bulk water dew point, with most of the water being evaporated, but with some water droplets remaining unevaporated. Preferably the amount of liquid water droplets left unevaporated is in the range of 0.5 mole % to 10 mole % with respect to the flue gas.

A time delay is then observed so as to allow the water and the flue gas to come to approximately the same temperature.

Following this delay, gaseous ammonia is injected into the mixture. The number of moles injected is preferably 0.5 to 2.5 times the number of moles of SO$_2$ in the flue gas, more preferably 0.9 to 2.0, and most preferably 1.5 to 2.0. The result of this action is that the ammonia and the water react so as to form ammonium sulfite, (NH$_4$)$_2$SO$_3$ H$_2$O, and ammonium sulfate, NH$_4$HSO$_4$. The ammonium sulfite then condenses, most particularly on the surfaces of the submicron particles, due to their greater total surface area, as discussed previously. Water then condenses on the resultant ammonium sulfite-coated particles, due to the high affinity that ammonium-sulfite has for water. Some of this water will come from the water vapor, and some from water which evaporates from the droplets and then recondenses. The purpose of having unevaporated droplets now becomes clear. Their evaporation serves as a heat sink for latent heat which results from the condensation as noted above. Without this heat sink the temperature of the flue gas would be increased, thus adversely impacting the process.

Finally, the particle size is still further increased due to coagulation by Stefen flow, a reaction wherein the particles are attracted to each other. In addition ammonium sulfate will be captured and dissolved by the enlarged particles, thus resulting in an ammonium sulfite-sulfate solution.

As a result of these actions the particle size is increased. Calculations for a typical case have shown that approximately 1.39% water will condense from the vapor phase onto the ammonium sulfite-coated particles, and approximately 5.13% will vaporize from the droplets and condense on them. For a typical flue gas containing 10$^8$ particles/cc 0.2 micron mean diameter, condensing 6.52% water on the particles will increase their mean diameter to 4.4 microns, a particle size easily collected by known methods.

Additionally, as is well known to those skilled in the art, NO$_2$ reacts readily with aqueous solutions of the sulfite ion. Thus, reaction with the ammonium sulfite solution is to be expected, thus 8removing the residual NO$_2$.

The next step is to collect the now enlarged particles by any suitable means, such as fabric filters, electrostatic precipitators, or other means well known to one of ordinary skill. Such particles could be sold as fertilizer since they comprise a solution of ammonium sulfate.

The final step is to discharge the flue gas, usually by reheating and venting to the atmosphere. If the amount of residual $SO_3$ is low enough then the gas need be heated to only a buoyancy temperature, approximately 82.2° C. However, if the amount of residual $SO_3$ is not low enough then the gas must be heated to a temperature higher than the acid dew point, which is approximately 132.2° C. for a typical flue gas. Assuming that reheat to the buoyancy temperature is all that is required, a significant saving in heat of combustion of the coal that would be lost in contemporary processes can be effected. As noted above, if the usual wet scrubbers are utilized approximately 8.8% of the heat of combustion is lost, representing the amount of heat that is lost in the scrubbing process (4.4%), and the heat that must be added back in (4.4%) to raise the temperature above the acid dew point. In the process of the instant invention only about half of the heat is lost during cooling of the flue gas by the water droplets (2.2%), the rest being recovered in the heat exchanger, and only about 1.4% is needed to raise the temperature to the buoyancy temperature. Thus, only 3.6% is lost, resulting in a saving of about 5.2% (8.8%-3.6%). This represents a significant saving.

The above described process does an effective job of removing submicron particles and residual $NO_2$ and $SO_2$ from flue gas. However, it may not take care of unacceptable amounts of residual NO and $SO_3$. The above described process may be augmented, in other embodiments of the invention, with other methods for removing these latter substances. For instance, the coal may be combusted in a fluidized bed combustor (FBC) as described previously. This will remove most of the $SO_x$ compounds, while still leaving enough $SO_2$ to allow the process to work. (The process requires only about 100 ppm $SO_2$ for a typical flue gas.). However, the amount of $SO_3$ may be low enough to permit reheating to only the buoyancy temperature, thus permitting the recovery of a significant amount of the heat of combustion of the coal that would otherwise be lost, as described above.

A method for removing or oxidizing the NO would be utilized in other embodiments of the invention, such as, but not restricted to, a selective catalytic NO reduction method, or a selective noncatalytic NO reduction method, as described above. In this embodiment the NO reduction method would be effected prior to injection of the cold water droplets.

A method for reducing the $SO_3$ to $SO_2$ would be utilized in other embodiments of the invention, such as, but not restricted to, the methanol method. In this embodiment the methanol method, which employs an injection of methanol into the flue gas at a temperature ranging from about 500° C. to about 950° C., would be effected prior to injection of the cold water droplets. It should be noted that this method oxidizes the NO to $NO_2$ as well as reducing the $SO_3$ to $SO_2$. It should also be noted that this embodiment is compatible with the use of the selective noncatalytic NO reduction method but not with the selective catalytic NO reduction process, due to the temperature involved.

BRIEF DESCRIPTION OF THE DRAWINGS

Reference is next made to a brief description of the drawings, which are intended to illustrate several different embodiments of the present invention with respect to the manner of making and using same in its presently understood best mode. The drawings and the detailed description which follow are intended to be merely illustrative and not otherwise limiting of the scope of the invention as set forth in the appended claims.

DETAILED DESCRIPTION OF THE INVENTION

Figure 1:
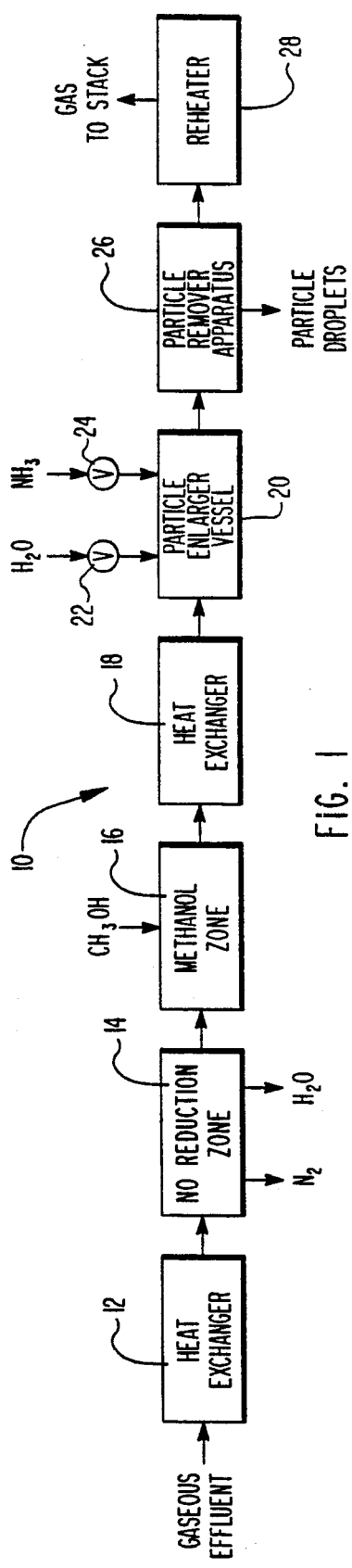
FIG. 1 shows, in diagrammatic form, a gaseous effluent flow chart for the embodiment of the invention employing a selective noncatalytic NO reduction process plus a methanol process for reducing the $SO_3$.

Referring to FIG. 1, as shown, the gaseous effluent flows from a combustor, or other apparatus, into a heat exchanger 12 wherein sufficient heat is recovered to reduce the temperature to about 1000° C. The heat exchanger is of a typical configuration well known in the industry and is not further described herein.

The gaseous effluent then flows into a selective noncatalytic NO reduction apparatus or zone 14 wherein at least most of the NO is reduced by reaction with ammonia, which is injected therein, and thus removed eventually as nitrogen and water. This is a well known process, and thus is not described further herein.

Next the gaseous effluent is flowed into an apparatus or zone 16 wherein it is mixed with injected methanol, thus oxidizing residual NO to $NO_2$, and reducing residual $SO_3$ to $SO_2$. This process is described in U.S. Pat. Nos. to Lyon, 4,743,436, titled "Method for Preventing Ammonium Bisulfate Formation During the Noncatalytic Reduction of Nitric Oxide," and 4,849,192, titled "Method for Preventing Formation of Sulfuric Acid and Related Products in Combustion Effluents," both of which are incorporated herein by reference.

Next the flue gas is flowed into a second heat exchanger 18 wherein further heat is recovered, but sufficient heat is left that the process as described above can be effected. In other words, there must be sufficient heat left to vaporize much of the cold water later injected, but not so much as to vaporize all of the injected water, as explained previously.

The gaseous effluent is then flowed into a passive vessel 20 wherein the particle enlargement process is effected. A passive vessel is defined herein as being one which is not configured so as to function as a venturi scrubber wherein mixing is effected by the gaseous effluent and a reducing agent being introduced at high velocity and subsequently flowed through a constricted orifice. Water droplets are injected as a fine mist into vessel 20, preferably by way of a metering valve 22, in such a fashion as to achieve an approximately uniform dispersion of water droplets in the gas. There is sufficient water injected so as to reduce the temperature of the mixture to substantially the bulk water dew point, by vaporization of the injected water, but also so as to leave some water droplets unevaporated. Preferably, the amount of unevaporated water will be in the range of 0.5 mole % to 10 mole % with respect to the gaseous effluent. For a typical flue gas produced by the combustion of coal the bulk water dew point will be approximately 52.5° C.

The mixture is left to achieve a substantially uniform temperature, following which gaseous ammonia is injected, preferably by way of a metering valve 24. As with the water, the ammonia is injected so as to achieve an approximately uniform dispersion within the gas. Preferably, the number of moles of ammonia injected is in the range of 0.5 to 2.5 times the number of moles of $SO_2$ in the gas, more preferably within the range of 0.9 to 2.0, and most preferably within the range of 1.5 to 2.0. This action will enlarge the particles to a collectable size, as explained above, with ammonium sulfite being deposited on the submicron particles, water condensed thereon, ammonium sulfate in solution thereon, and $NO_2$ absorbed thereon, all as previously explained.

The next step is to remove the now enlarged particles. This is preferably accomplished by flowing the gas into a particle remover apparatus 26 wherein the particles are removed by any one of processes well known in the art, and thus not described further herein.

The next step is to reheat the gas in a reheater 28 to a buoyancy temperature, approximately 82.2° C., and to vent the gas into the atmosphere. If necessary, the reheater may reheat to a temperature higher than the acid dew point.

Additionally, one or more of the apparatuses or heat exchangers may be combined, or omitted, rather than provided as separate components.

Figure 2:
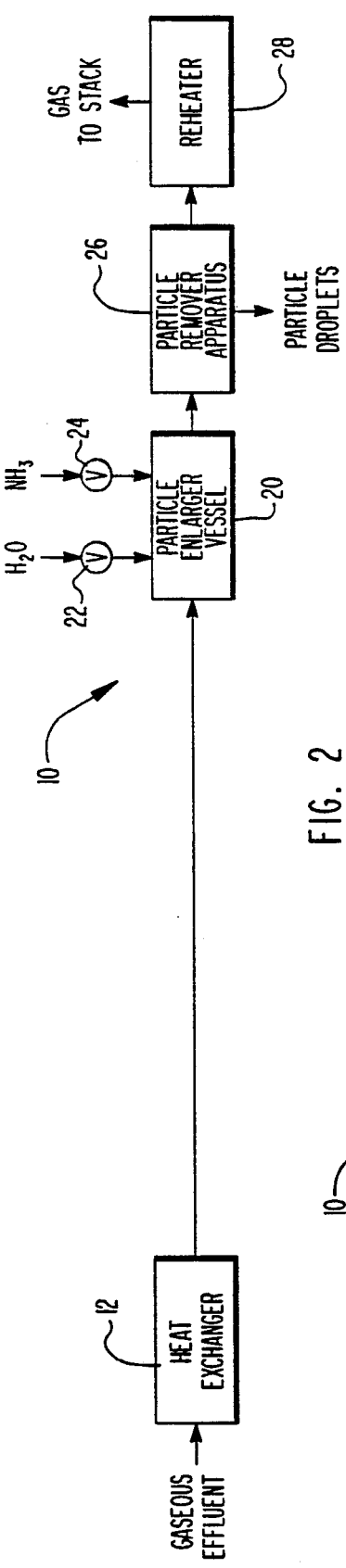
FIG. 2 shows, in diagrammatic form, a flow chart for the embodiment of the invention wherein the NO reduction process and the process for reducing $SO_3$ are omitted.

As explained above, other embodiments of the invention may omit the NO reduction process, and thus its corresponding apparatus; the methanol process, and thus its corresponding apparatus; and one or both of the heat exchangers, as shown in FIG. 2. This embodiment would be utilized for situations wherein the gaseous effluent did not contain unacceptable levels of $NO_x$ or $SO_3$.

Figure 3:
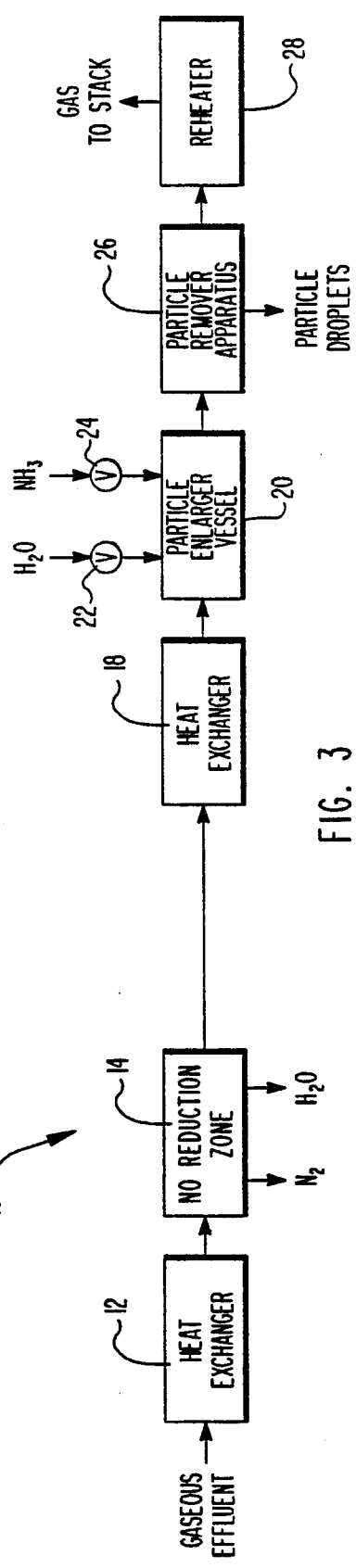
FIG. 3 shows, in diagrammatic form, a flow chart for the embodiment of the invention wherein the apparatus for reducing $SO_3$ is omitted.

Still other embodiments of the invention may include the NO reduction method, and its corresponding apparatus, but omit the methanol process, and its corresponding apparatus, as shown in FIG. 3. This embodiment could be utilized for situations such as those employing a fluidized bed combustor wherein the $SO_x$ components are substantially removed during the combustion process.

The following examples are given to illustrate the method of the present invention, although these examples should be understood as being exemplary in nature and are not intended to limit the scope of the present invention.

EXAMPLE 1

Figure 4:
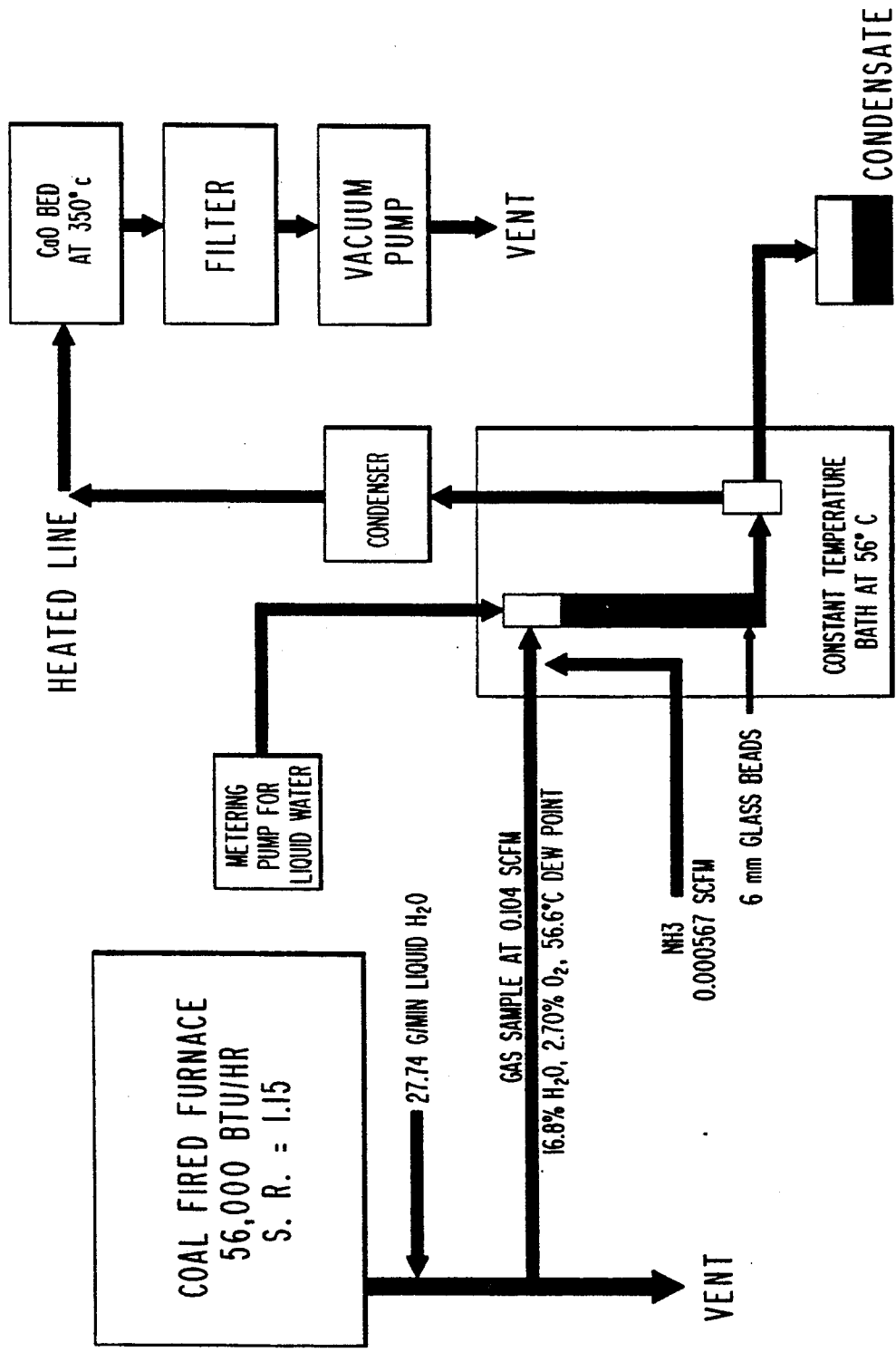
FIG. 4 shows, in diagrammatic form, an experimental setup for demonstration of particle removal by the method of the invention.

This example details the results obtained in a group of related laboratory experiments. FIG. 4 shows a laboratory apparatus which was used to perform experiments that illustrate the operating principles of the instant invention.

The test furnace was a 70,000 BTU capacity downfired facility, 15.2 cm in inside diameter with walls of high temperature castable refractory. The furnace entry included a 63.0 cm long quarl that diverged from 5.1 to 15.2 cm. This quarl provides a steady flame. Pulverized coal was supplied by a twin screw pneumatic feeder and was transported by the primary air to a premixed burner. This burner produced predominantly one dimensional flow. The primary air and pulverized coal were injected radially downward and the secondary air was injected radially into the premixing chamber.

In these experiments the furnace was fired at 56,000 BTU/hr with an Illinois coal, 10857 BTU/lb., 7.11 wt % moisture, 62.28 wt % carbon, 4.12 wt % hydrogen, 1.07 wt % nitrogen, 3.34 wt % sulfur, 8.75 wt % ash and 13.32 wt % oxygen by difference. The ratio of air to fuel was 1.15 times stoichiometric.

It is the teaching of the instant invention that after the combustion effluents are cooled by heat recovery they are to be further cooled to the bulk water dew point by injection of water droplets, the amount of said injected water being sufficient so that some water droplets remain unevaporated when the flue gas is cooled to the bulk water dew point. In a full scale combustion system said droplets would, if small, have little or no tendency to settle out of the combustion effluents. In a small scale laboratory apparatus, however, droplet settling is a problem. Accordingly to simulate the situation in a full scale combustion facility the following steps were taken:

First, as the hot flue gas left the furnace it was humidified by injection of water. This increased the water vapor content of the flue gas to 16.8% and increased its dew pint to 56.6° C. After a stream of test gas was removed the combustion gases were vented.

Secondly, this test gas was then cooled to 57° C. by flowing through a length of tubing in a constant temperature bath, and the test gas was passed downward through a bed of 6 mm glass beads. A measured flow of distilled water was also passed through the bed of glass beads. Thus, the test gas was at the bulk water dew point and in intimate contact with liquid water.

In some experiments $NH_3$ was not used. In others, it was also added in an amount sufficient to give the test gas 5452 ppm $NH_3$, i.e., $NH_3$ was added at 2/1 with respect to $SO_2$.

After removal of the liquid phase the test gas went via heated lines through a bed of calcined limestone at 350° C. to remove any remaining $SO_2$. It then passed through a fine filter (i.e., a 0.1 micron pore size 47 mm diameter filter), through a vacuum pump and was vented. This fine filter was weighted before the start of the experiment and after its completion.

It should be understood that while this fine filter is a useful way of measuring the amount of particles in a flowing gas, it involves a high pressure drop and hence is not practical for the control of particulate emissions. Removal of any remaining $SO_2$ with the bed of calcined limestone prevents the fine filter from collecting any ammonium sulfite or sulfate. Thus the material which is collected by the high pressure drop filter is entirely fly ash and represents that portion of the initial fly ash which is most resistant to removal by filtration, i.e. the fine particles.

It should also be understood that the bed of beads is a low pressure drop filter. Low pressure drop filters are one of the control devices commonly used to control particulate emissions on full scale combustion systems. The conditions under which ammonium sulfite will form are well known and it is clear that if ammonia is injected into the flowing gases going through the bed of beads will cause the formation of ammonium sulfite.

Figure 5:
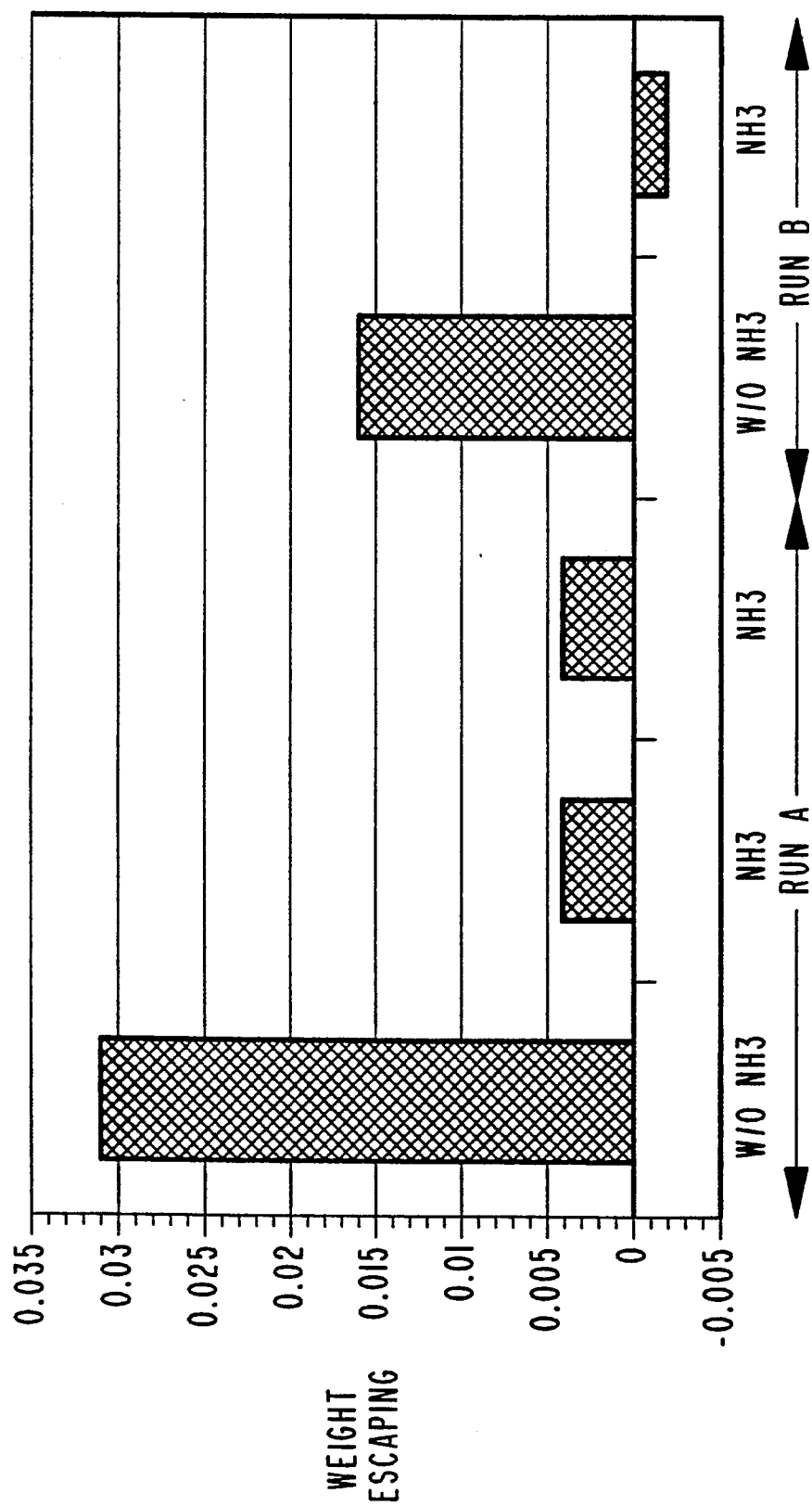
FIG. 5 shows results obtained for the filtration of fine particles in the experimental setup of FIG. 4.

FIG. 5 shows the results of a series of experiments in which the effect of ammonium injection on particle capture by the bed of beads was measured. Without ammonia injection the bed of beads passed only 0.031 wt % in run A and only 0.016 wt % in run B. This high collection efficiency means that, in addition to collecting virtually all the larger particles, the bed is collecting some of the more difficult to collect of the submicron particles.

The injection of ammonium improves this already high collection efficiency by approximately an order of magnitude, i.e.. the bed also becomes an efficient collector of the submicron particles.

EXAMPLE 2

This example details theoretical results obtained by calculation for a typical coal.

A coal fired utility boiler burns a coal having 33.71 wt % moisture, 7.3 wt % ash, 42.5 wt % C, 6.8 wt % H, 2.12 wt % S, 7,348 BTU/lb, in 120% of theoretical air. In this example, flue gas composition will be given in mole % and the procedure above produces a flue gas that is 72.1% $N_2$, 13.8% $H_2O$, 11.0% $CO_2$, 3.0% $O_2$, 2000 ppm SOx, and roughly 600 ppm NO. Of the SOx, roughly 10 ppm will be $SO_3$. The acid dew point of this flue gas will be 135° C. For the flue gas, the bulk water dew point is 52.5° C. For the flue gas, the bulk water dew point is 52.5° C.

As is typical for a utility boiler, the flue gas in this utility boiler leaves the region of combustion and flows through a series of tubing banks which recover the heat it contains. These tubing banks are separated by sootblowing cavities. Since very little heat is removed from the flue gas as it passes through these cavities, the temperature of the flue gas within these cavities is nearly constant.

As the flue gas passes through one cavity, in which its temperature is 975° C., $NH_3$ is injected into the flue gas. This injection is done in such a manner that the $NH_3$ is rapidly and nearly uniformly mixed with the flue gas to a concentration of 800 ppm. The design of the boiler is such that this cavity provides a residence time for the flue gas of 0.1 seconds. The well-known Thermal DeNOx chemistry occurs, reducing to 180 ppm.

At a second cavity downstream of the ammonia injection location, where the flue gas temperature is 675° C., 200 ppm methanol is injected, again with rapid and uniform mixing. The design of the boilers is such that this cavity provides a residence time for the flue gas of 0.3 seconds. The methanol reacts reducing 90% of the $SO_3$ to $SO_2$ and converting 95% of the remaining 180 ppm NO to $NO_2$.

The process of heat recovery from the flue gas is continued until its temperature is approximately 92.4° C. The flue gas then leaves the heat recovery section of the utility boiler and flows through an enclosed volume within which it is contacted with a fine spray of water droplets. The evaporation of these droplets cools the flue gas to 56.5° C. and increases the water vapor content to 16.7%. The amount of the liquid droplets which remain unevaporated is greater than 5 13%.

Following the injection and evaporation of the water droplets 3900 ppm $NH_3$ is injected. Since the saturation temperature for precipitation of solid $(NH_4)_2SO_3\ H_2O$ is 59.8° C., $(NH_4)_2SO_3\ H_2O$ is precipitated. Furthermore, since the submicron particles have most of the surface area, the $(NH_4)_2SO_3\ H_2O$ precipitates chiefly onto them. Since $(NH4)_2SO_3\ H_2O$ is highly water soluble and its solutions have a lower vapor pressure than does bulk water, 1.39% water condenses on the submicron particles from the vapor phase and another 5.13% water is vaporized from the droplets and condenses on the submicron particles.

The flue gas contains $10^8$ submicron particles/cc with a mean diameter of 0.2 microns. Condensing this much water on them causes their diameter to increase to 4.4 microns. Furthermore, the well-known process of Stefen flow causes these very wet particles to agglomerate, decreasing the number of them and further increasing their size.

$NO_2$ reacts readily with solutions containing sulfite ion. During this reaction, the $NO_2$ is converted to nitrite ion and the sulfite ion is oxidized to sulfate. Thus, the wet droplets absorb the $NO_2$ from the gas phase.

The flue gas is then passed into a wet electrostatic precipitator, i.e., a precipitator which is designed to remove particles that contain substantial amounts of water. Since the submicron particles are now large particles containing droplets, they are efficiently collected. The flue gas, now purified of $SO_2$, $SO_3$, NOx, and submicron particles is reheated to a temperature of 180° F. or 82.2° C. and discharged to the atmosphere.

It will be readily appreciated that this example shows a considerable improvement in energy efficiency over conventional technology. In conventional technology (i.e., scrubbers), heat recovery would necessarily have stopped at a flue gas temperature of 132.2° C. The flue gas would then have gone into the scrubber where it would have been cooled to the bulk water dew point of 52.5° C. The sensible heat lost in cooling the flue gas in this manner is 4.4% of the coal's heat of combustion. After scrubbing, the flue gas would then have to be reheated to the acid dew point at a cost of another 4.4%. In contrast, in this example, sensible heat is recovered from the flue gas until its temperature is 92.4° C. Thus, the heat lost by evaporation of water is only 2.2%. Furthermore, it is sufficient to reheat the flue gas to 82.2° C. which costs only 1.6% of the coal's heat of combustion.

In contrast, then, to the 8.8% of the coal's heat of combustion which is lost by conventional technology, in this example the instant invention loses only 3.8%, a savings of 5% of the coal's heat of combustion.

EXAMPLE 3

This example details theoretical results obtained by calculation for a catalytic cracker.

A fluid bed catalytic cracker is used to convert oil to gasoline. One of the by-products of this process is coke which tends to accumulate on the catalyst and decrease its activity. To maintain the activity of the catalyst, a portion of it is continually removed from the cracking vessel and sent to a fluid bed combustion device called the regenerator. After the coked catalyst is burned free of carbon within the regenerator, it is returned to the cracker.

The gas coming out of a regenerator is called regenerator offgas. As is typical for regenerator offgas, the gas in this example has a composition of 72.1% $N_2$, 13.8% $H_2O$, 11.0% $CO_2$, 3.0% $O_2$, 2000ppm SOx, and 180 ppm NO. The regenerator offgas also contains submicron particles of catalyst called cat fines. Of the SOx, roughly 200 ppm will be $SO_3$. The regenerator operates at a temperature of 675° C. Above the fluid bed where the coked catalyst is burned, there is a large empty space called the free board. 420 ppm methanol is injected into this region with rapid and complete mixing, converting 90% of the $SO_3$ to $SO_2$ and 95% of the NO to $NO_2$.

Heat is recovered from the regenerator offgas until its temperature approaches the acid dew point. It is then contacted with a fine spray of water which cools it by evaporation to the bulk water dew point. Enough of this fine water spray is used so that at least 5.13% liquid water remains unevaporated. Ammonia is then injected, and as in Example 2, the submicron particles, the $SO_2$ and the $NO_2$ are all converted into droplets which are removed by a wet electrostatic precipitator and the regenerator offgas is reheated to 82.2° C. and vented.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for removal of submicron particles from gaseous effluents which contain sulfur dioxide among other substances, comprising the steps of:
   injecting liquid water droplets into a gaseous effluent containing submicron particles, said effluent being at a temperature higher than the bulk water dew point, said injection step cooling the effluent to approximately the bulk dew point of water and causing at least some but less than all of the water to evaporate;
   delaying the injection of any further substances into the effluent until the effluent and the injected water reach a substantially uniform temperature at approximately the bulk water dew point;
   following said delay, injecting gaseous ammonia into the resulting mixture of effluent and water in order to cause ammonium sulfite on said submicron particles, thus increasing the size of said particles, and also such as to cause water to condense onto the ammonium sulfite-coated particles, thus further increasing the size of said particles; and
   separating at least some of the resultant enlarged particles from the effluent.

2. A method for removal of submicron particles from gaseous effluents as described in claim 1 wherein the sulfur dioxide in the gaseous effluent comprises at least 100 ppm with respect to the gaseous effluent.

3. A method for removal of submicron particles from gaseous effluents as defined in claim 1 wherein the amount of liquid water left unevaporated is in the range of 0.5 mole % to 10 mole % with respect to the effluent.

4. A method for removal of submicron particles from gaseous effluents as defined in claim 1 wherein the injection of liquid water is performed so as to achieve an approximately uniform dispersion of water droplets in the effluent.

5. A method for removal of submicron particles from gaseous effluents as defined in claim 1 wherein the injection of gaseous ammonia is performed so as to achieve an approximately uniform dispersion of ammonia in the gaseous effluent.

6. A method for removal of submicron particles from gaseous effluents as defined in claim 1 wherein the number of moles of ammonia injected is in the range of 0.5 to 2.5 times the number of moles of sulfur dioxide in the gaseous effluent.

7. A method for removal of submicron particles from gaseous effluents as defined in claim 1 wherein the number of moles of ammonia injected is in the range of 0.9 to 2.0 times the number of moles of sulfur dioxide in the gaseous effluent.

8. A method for removal of submicron particles from gaseous effluents as defined in claim 1 wherein the number of moles of ammonia injected is in the range of 1.5 to 2.0 times the number of moles of sulfur dioxide in the gaseous effluent.

9. A method for removal of submicron particles from gaseous effluents as defined in claim 1 further comprising a step of recovering heat from the gaseous effluent prior to the introduction of water droplets into the effluent, the amount of heat recovered being limited such that the temperature of the gaseous effluent, prior to introduction of the water droplets, is higher than the bulk water dewpoint, and following introduction of the water droplets is approximately the bulk water dew point.

10. A method for removal of submicron particles from gaseous effluents as defined in claim 1 further comprising a step of reheating the gaseous effluent, following separation of the particle droplets, to a temperature higher than the acid dew point and venting said gaseous effluent to the atmosphere.

11. A method for removal of submicron particles from gaseous effluents as defined in claim 1 further comprising a step of reheating the gaseous effluent, following separation of the particle droplets, to a temperature sufficient for venting but lower than the acid dew point and venting said gaseous effluent to the atmosphere.

12. A method for removal of submicron particles from gaseous effluents containing, among other substances, sulfur dioxide ($SO_2$), and $NO_x$ components (NO and $NO_2$), comprising the steps of:
   reducing at least some of the $NO_x$ contained in the gaseous effluent resulting in free nitrogen;
   injecting liquid water droplets into a gaseous effluent containing submicron particles, said effluent being at a temperature higher than the bulk water dew point, said injection step cooling the effluent to approximately the bulk dew point of water and causing at least some but less than all of the water to evaporate;
   delaying the injection of any further substances into the effluent until the effluent and the injected water reach a substantially uniform temperature at approximately the bulk water dew point;
   following said delay, injecting gaseous ammonia into the resulting mixture of effluent and water in a passive vessel under conditions such as to cause ammonium sulfite to form and the condense onto the submicron particles, thus increasing their size, and also such as to cause water to condense onto the ammonium sulfite-coated particles, thus further increasing their size, and also such as to promote the reaction with, and thus capture of, $NO_2$ by the ammonium sulfite, and also such as to promote coagulation of the now enlarged particles by Stefen flow, thus further increasing their size; and separating at least some of the resultant enlarged particles from the effluent.

13. A method for removal of submicron particles from gaseous effluents as defined in claim 12 wherein the sulfur dioxide in the gaseous effluent comprises at least 100 ppm with respect to the gaseous effluent.

14. A method for removal of submicron particles from gaseous effluents as defined in claim 12 wherein the step of reducing at least some of the $NO_x$ comprises a selective noncatalytic NO reduction process.

15. A method for removal of submicron particles from gaseous effluents as described in claim 12 wherein the step of reducing at least some of the $NO_x$ comprises a selective catalytic NO reduction process.

16. A method for removal of submicron particles from gaseous effluents as defined in claim 12 wherein the amount of liquid water left unevaporated is in the range of 0.5 mole % to 10 mole % with respect to the effluent.

17. A method for removal of submicron particles from gaseous effluents as defined in claim 12 wherein the injection of liquid water is performed so as to achieve an approximately uniform dispersion of water droplets in the effluent.

18. A method for removal of submicron particles from gaseous effluents as defined in claim 12 wherein the injection of gaseous ammonia is performed so as to achieve an approximately uniform dispersion of ammonia in the gaseous effluent.

19. A method for removal of submicron particles from gaseous effluents as defined in claim 12 wherein the number of moles of ammonia injected is in the range of 0.5 to 2.5 times the number of moles of sulfur dioxide in the gaseous effluent.

20. A method for removal of submicron particles from gaseous effluents as defined in claim 12 wherein the number of moles of ammonia injected is in the range of 0.9 to 2.0 times the number of moles of sulfur dioxide in the gaseous effluent.

21. A method for removal of submicron particles from gaseous effluents as defined in claim 12 wherein the number of moles of ammonia injected is in the range of 1.5 to 2.0 times the number of moles of sulfur dioxide in the gaseous effluent.

22. A method for removal of submicron particles from gaseous effluents as defined in claim 12 further comprising the step of recovering sensible heat from the gaseous effluent prior to injection of the water droplets, said recovery being restricted such that the resultant temperature of the gaseous effluent, following injection of the water droplets, is approximately the bulk water dew point.

23. A method for removal of submicron particles from gaseous effluents as defined in claim 12, further comprising the step of recovering sensible heat from the gaseous effluent prior to the step of reducing at least some of the $NO_x$, said recovery being restricted such that the temperature of the gaseous effluent is compatible with the step of reducing at least some of the $NO_x$.

24. A method for removal of submicron particles from gaseous effluents as defined in claim 12 further comprising a step of reheating the gaseous effluent, following separation of the resultant enlarged particles, to a temperature higher than the acid dew point and venting said gaseous effluent to the atmosphere.

25. A method for removal of submicron particles from gaseous effluents as defined in claim 12 further comprising a step of reheating the gaseous effluent, following separation of the resultant enlarged particles, to a temperature sufficient for venting but lower than the acid dew point and venting said gaseous effluent to the atmosphere.

26. A method for removal of submicron particles from gaseous effluents containing, among other substances, $SO_x$ components ($SO_2$ and $SO_3$), and $NO_x$ components (NO and $NO_2$), comprising the steps of:

reducing at least some of the $NO_x$ contained in the gaseous effluent resulting in free nitrogen;

reducing at least some of the $SO_3$ to $SO_2$;

oxidizing at least some of the NO to $NO_2$;

injecting liquid water droplets into a gaseous effluent containing submicron particles, said effluent being at a temperature higher than the bulk water dew point, said injection step cooling the effluent to approximately the bulk dew point of water and causing at least some but less than all of the water to evaporate;

delaying the injection of any further substances into the effluent until the effluent and the injected water reach a substantially uniform temperature at approximately the bulk water dew point;

following said delay, injecting gaseous ammonia into the resulting mixture of effluent and water in a passive vessel under conditions such as to cause ammonium sulfite to form and to condense onto the submicron particles, thus further increasing their size, and also such as to promote the reaction with, and thus capture of $NO_2$ by the ammonium sulfite, and also such as to promote coagulation of the now enlarged particles by Stefen flow, thus further increasing their size; and separating at least some of the resultant enlarged particles from the effluent.

27. A method for removal of submicron particles from gaseous effluents as defined in claim 29 wherein the $SO_2$ (sulfur dioxide) in the gaseous effluent comprises at least 100 ppm with respect to the gaseous effluent.

28. A method for removal of submicron particles from gaseous effluents as defined in claim 26 wherein the step of reducing at least some of the $NO_x$ comprises a selective noncatalytic NO reduction process.

29. A method for removal of submicron particles from gaseous effluents as defined in claim 26 wherein the steps of reducing at least some of the $SO_3$ to $SO_2$ and oxidizing at least some of the NO to $NO_2$ comprises a process wherein methanol is introduced into the gaseous effluent.

30. A method for removal of submicron particles from gaseous effluents as defined in claim 29 wherein the methanol contacts the gaseous effluents at a temperature ranging from about 500° C. to about 950° C.

31. A method for removal of submicron particles from gaseous effluents as defined in claim 26 wherein the amount of liquid water left unevaporated is in the range of 0.5 mole % to 10 mole % with respect to the effluent.

32. A method for removal of submicron particles from gaseous effluents as defined in claim 26 wherein the injection of liquid water is performed so as to achieve an approximately uniform dispersion of water droplets in the effluent.

33. A method for removal of submicron particles from gaseous effluents as defined in claim 26 wherein the injection of gaseous ammonia is performed so as to achieve an approximately uniform dispersion of ammonia in the gaseous effluent.

34. A method for removal of submicron particles from gaseous effluents as defined in claim 26 wherein the number of moles of ammonia injected is in the range of 0.5 to 2.5 times the number of moles of sulfur dioxide in the gaseous effluent.

35. A method for removal of submicron particles from gaseous effluents as defined in claim 26 wherein the number of moles of ammonia injected is in the range of 0.9 to 2.0 times the number of moles of sulfur dioxide in the gaseous effluent.

36. A method for removal of submicron particles from gaseous effluents as defined in claim 26 wherein the number of moles of ammonia injected is in the range of 1.5 to 2.0 times the number of moles of sulfur dioxide in the gaseous effluent.

37. A method for removal of submicron particles from gaseous effluents as defined in claim 26 further comprising the step of recovering sensible heat from the gaseous effluent prior to injection of the water droplets, said recovery being restricted such that the resultant temperature of the gaseous effluent, following injection of the water droplets, is approximately the bulk water dew point.

38. A method for removal of submicron particles from gaseous effluents as defined in claim 26, further comprising the step of recovering sensible heat from the gaseous effluent prior to the step of reducing at least some of the $NO_x$, said recovery being restricted such that the temperature of the gaseous effluent is compatible with the step of reducing at least some of the $NO_x$.

39. A method for removal of submicron particles from gaseous effluents as defined in claim 26 further comprising a step of reheating the gaseous effluent, following separation of the resultant enlarged particles, to a temperature higher than the acid dew point and venting said gaseous effluent to the atmosphere.

40. A method for removal of submicron particles from gaseous effluents as defined in clam 26 further comprising a step of reheating the gaseous effluent, following separation of the resultant enlarged particles, to a temperature sufficient for venting but lower than the acid dew point and venting said gaseous effluent to the atmosphere.

* * * * *

UNITED STATES PATENT AND TRADEMARK OFFICE
CERTIFICATE OF CORRECTION

PATENT NO. : 5,225,175
DATED : July 6, 1993
INVENTOR(S) : RICHARD K. LYON

It is certified that error appears in the above-indentified patent and that said Letters Patent is hereby corrected as shown below:

Title page, Item [56] after "Primary Examiner -- Gregory A. Heller," the following should be listed on the next line: --Attorney, Agent, or Firm - Workman, Nydegger & Jensen--
    Column 4, line 68, "8removing" should be --removing--
    Column 9, line 2, "beads will" should be --beads, this will--
    Column 9, line 63, "5 13%" should be --5.13%--
    Column 11, line 43, after "ammonium nitrite" insert --to condense--
    Column 12, line 60, "the condense" should be --to condense--
    Column 16, line 17, "clam 26" should be --claim 26--

Signed and Sealed this

Twelfth Day of April, 1994

Attest:

*Attesting Officer*

BRUCE LEHMAN

*Commissioner of Patents and Trademarks*